United States Patent
Vissa et al.

(10) Patent No.: US 9,940,498 B2
(45) Date of Patent: Apr. 10, 2018

(54) LOW POWER APPLICATION ACCESS USING FINGERPRINT SENSOR AUTHENTICATION

(71) Applicant: Motorola Mobility LLC, Chicago, IL (US)

(72) Inventors: Sudhir Vissa, Bensenville, IL (US); Lauren Schwendimann, Evanston, IL (US); David Schuster, Buffalo Grove, IL (US); Vivek Tyagi, Chicago, IL (US)

(73) Assignee: Motorola Mobility LLC, Chicago, IL (US)

(*) Notice: Subject to any disclaimer, the term of this patent is extended or adjusted under 35 U.S.C. 154(b) by 71 days.

(21) Appl. No.: 15/261,010

(22) Filed: Sep. 9, 2016

(65) Prior Publication Data
US 2018/0075273 A1   Mar. 15, 2018

(51) Int. Cl.
G06K 9/00 (2006.01)
G06F 3/0488 (2013.01)
G06F 3/0481 (2013.01)

(52) U.S. Cl.
CPC ....... *G06K 9/00013* (2013.01); *G06F 3/0488* (2013.01); *G06F 3/04817* (2013.01)

(58) Field of Classification Search
CPC combination set(s) only.
See application file for complete search history.

(56) References Cited

U.S. PATENT DOCUMENTS

| | | | |
|---|---|---|---|
| 8,842,919 B2* | 9/2014 | Katz | G06F 3/017 382/203 |
| 9,134,896 B2* | 9/2015 | Fadell | G06F 21/316 |
| 9,377,867 B2* | 6/2016 | Katz | G06F 3/017 |
| 9,632,664 B2* | 4/2017 | Foss | G06F 3/0482 |
| 2007/0075968 A1* | 4/2007 | Hall | G06F 3/046 345/157 |
| 2009/0005011 A1* | 1/2009 | Christie | G06Q 10/107 455/412.2 |
| 2010/0125785 A1* | 5/2010 | Moore | G06F 3/04817 715/702 |
| 2010/0125811 A1* | 5/2010 | Moore | G06F 3/04817 715/846 |
| 2012/0319985 A1* | 12/2012 | Moore | G06F 3/04817 345/173 |
| 2014/0057610 A1* | 2/2014 | Olincy | H04W 4/16 455/414.1 |
| 2014/0157210 A1* | 6/2014 | Katz | G06F 3/017 715/863 |
| 2014/0162598 A1* | 6/2014 | Villa-Real | H04M 1/66 455/411 |
| 2015/0146945 A1* | 5/2015 | Han | G06K 9/00033 382/125 |
| 2017/0068322 A1* | 3/2017 | Steinberg | G06F 3/017 |

* cited by examiner

*Primary Examiner* — Anand Bhatnagar
(74) *Attorney, Agent, or Firm* — Amerson Law Firm, PLLC

(57) ABSTRACT

A method includes detecting an interaction event on a display of a device in a locked mode. The interaction event originates at one of a fingerprint sensor of the device or an application icon and terminates at the other of the fingerprint sensor or the application icon. The interaction event is authenticated using the fingerprint sensor. A function associated with the application icon is activated responsive to authenticating the interaction event without unlocking the device.

20 Claims, 4 Drawing Sheets

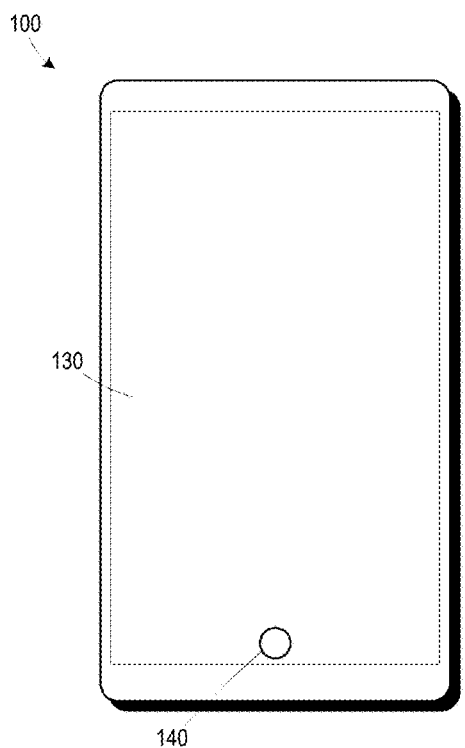
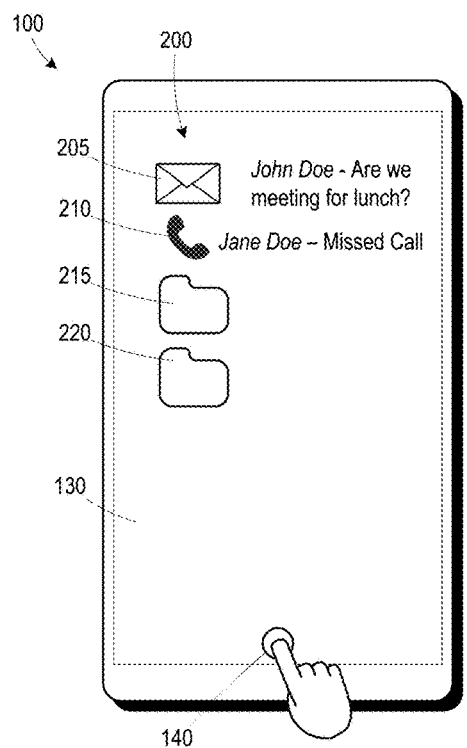
FIG. 2  FIG. 3

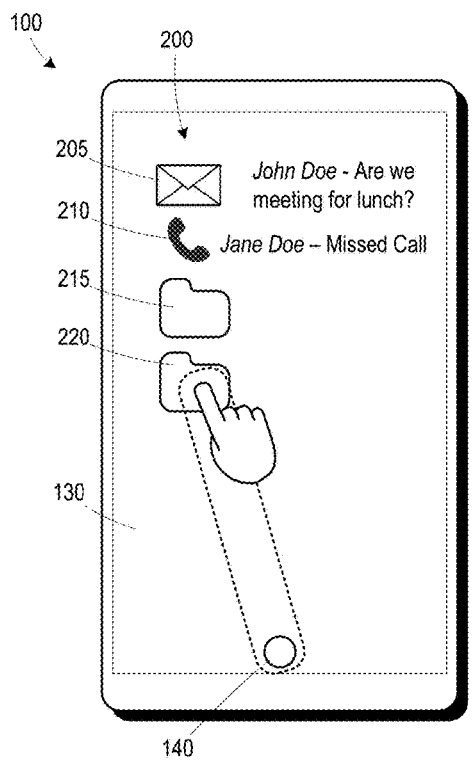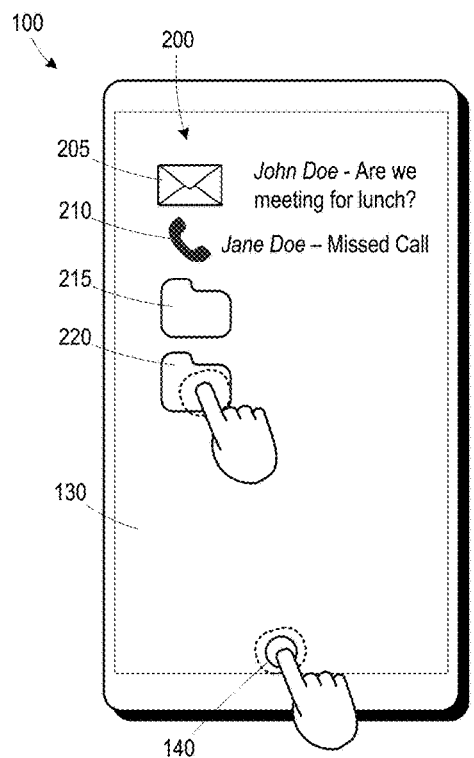
FIG. 4  FIG. 5

LOW POWER APPLICATION ACCESS USING FINGERPRINT SENSOR AUTHENTICATION

BACKGROUND

Field of the Disclosure

The disclosed subject matter relates generally to mobile computing systems and, more particularly, to accessing applications in a low power mode using a fingerprint sensor authentication without exiting the low power mode.

Description of the Related Art

Mobile devices include displays that also function as touch sensitive user interfaces. In some applications, a low power, always-on display (AoD) mode is employed to display notifications to a user, such as missed calls, voice mails, incoming messages, etc. While the AoD informs the user of the notifications, to interact with the applications associated with the notifications, a user must unlock the device, thereby exiting the low power mode.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

FIGS. 2-6 are front views of the device of FIG. 1 illustrating interaction events for invoking low power application functions, according to some embodiments disclosed herein.

The use of the same reference symbols in different drawings indicates similar or identical items.

DETAILED DESCRIPTION OF EMBODIMENT(S)

FIGS. 1-6 illustrate example techniques for accessing applications in a low power mode using a fingerprint sensor without exiting the low power mode. Interactions with the display of the device include interactions with a fingerprint sensor so that access requests can be authenticated and applications can be activated in the low power mode. The interactions may include a swipe event that starts at one of a fingerprint sensor or application icon and terminates at the other of the fingerprint sensor or application icon.

Figure 1:
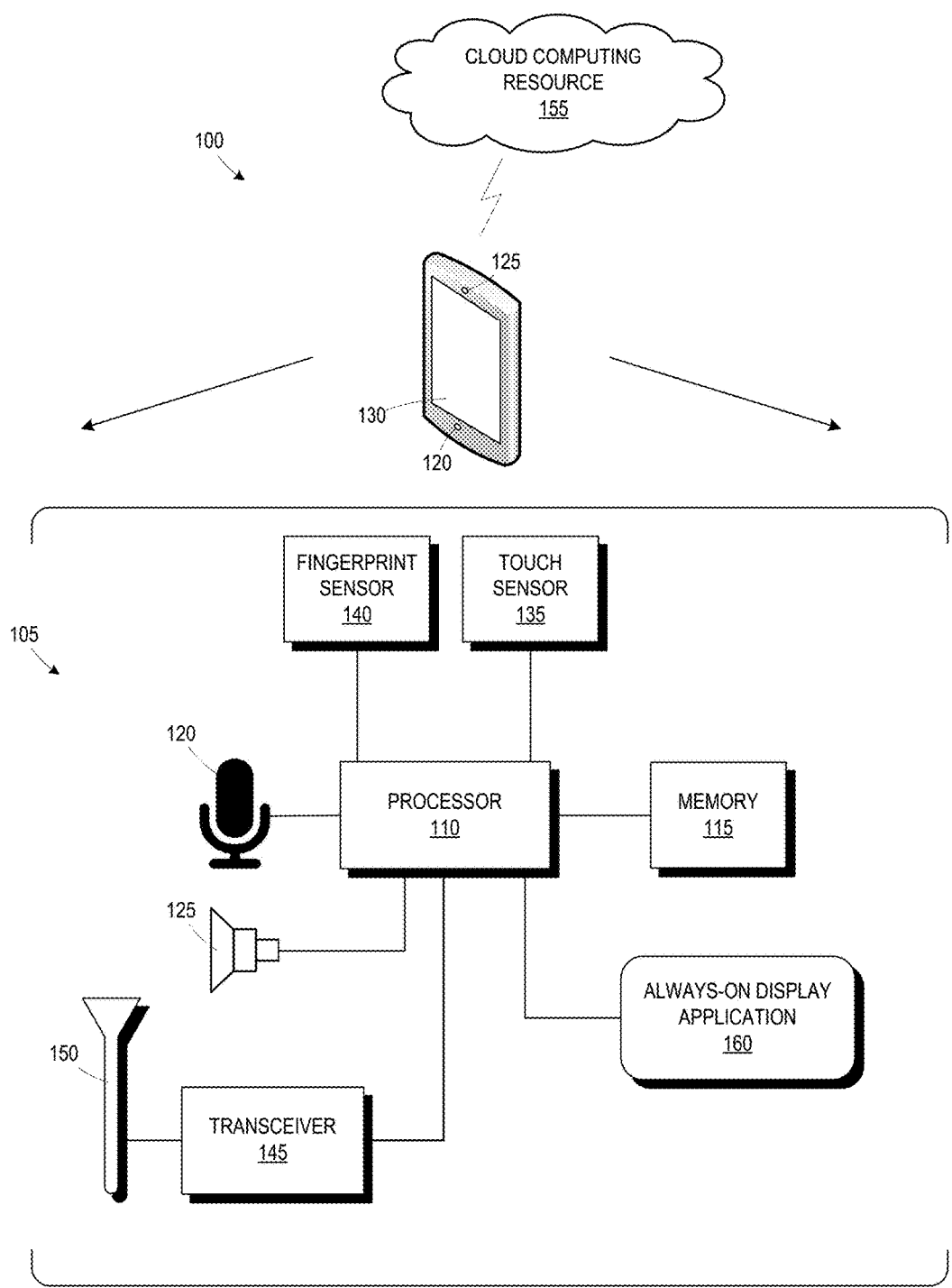
FIG. 1 is a simplified block diagram of a mobile device operable to allow accessing of applications in a low power mode using a fingerprint sensor without exiting the low power mode, according to some embodiments disclosed herein.

FIG. 1 is a simplistic block diagram of a device 100. The device 100 implements a computing system 105 including, among other things, a processor 110, a memory 115, a microphone 120, a speaker 125, a display 130, a touch sensor 135 (e.g., capacitive sensor) associated with the display 130, and a fingerprint sensor 140. The memory 115 may be a volatile memory (e.g., DRAM, SRAM) or a non-volatile memory (e.g., ROM, flash memory, hard disk, etc.). The device 100 includes a transceiver 145 for transmitting and receiving signals via an antenna 150 over a communication link. The transceiver 145 may include one or more radios for communicating according to different radio access technologies, such as cellular, Wi-Fi, Bluetooth®, etc. The communication link may have a variety of forms. In some embodiments, the communication link may be a wireless radio or cellular radio link. The communication link may also communicate over a packet-based communication network, such as the Internet. In one embodiment, a cloud computing resource 155 may interface with the device 100 to implement one or more of the functions described herein.

In various embodiments, the device 100 may be embodied in a handheld or wearable device, such as a laptop computer, a handheld computer, a tablet computer, a mobile device, a telephone, a personal data assistant, a music player, a game device, a wearable computing device, and the like. To the extent certain example aspects of the device 100 are not described herein, such example aspects may or may not be included in various embodiments without limiting the spirit and scope of the embodiments of the present application as would be understood by one of skill in the art.

In the device 100, the processor 110 may execute instructions stored in the memory 115 and store information in the memory 115, such as the results of the executed instructions. Some embodiments of the processor 110 and the memory 115 may be configured to implement an always-on display (AoD) application 160. For example, the processor 110 may execute the AoD application 160 to display notifications on the display 130 and detect AoD interactions by the user with the display 130 during low power mode operation. One or more aspects of the techniques may also be implemented using the cloud computing resource 155 in addition to the AoD application 160.

FIG. 2 is a front view of the device 100 showing the display 130 and the fingerprint sensor 140. In some embodiments, the hardware for the fingerprint sensor 140 is disposed below an active portion of the display 130 (as illustrated in FIG. 2). In other embodiments, the hardware for the fingerprint sensor 140 may be outside the active region, but the touch sensor 135 may extend beyond the bounds of the display such that the touch sensor 135 may detect an interaction on the fingerprint sensor 140 and on the display 130, such as a swipe between the fingerprint sensor 140 and an application icon displayed on the display 130 (i.e., in either direction).

In FIG. 2, the device 100 is illustrated in a low power state, where the device is locked and full functionality is not present. In such a state, the functionality of the device 100 may be limited (e.g., receiving calls or messages, and providing status information on the display 130).

FIG. 3 illustrates the device 100 wherein a user interaction is detected at the fingerprint sensor 140. Responsive to detecting a touch event at the fingerprint sensor 140, the AoD application 160 displays one or more registered application icons 200 without unlocking the device 100 or exiting the low power state. Example application icons include a message icon 205, a call icon 210, and generic icons 215, 220. In some embodiments, a time threshold may be employed. If a time interval for the touch event is less than a predetermined interval, the AoD application 160 identifies the touch event as an unlock request, and the device 100 is unlocked responsive to authentication of the user's fingerprint. If the time interval for the touch event is greater than the threshold, e.g., a long touch, the AoD application 160 displays the application icons 200 without unlocking the device 105.

Following the first touch event at the fingerprint sensor 140, the AoD application 160 may detect a second touch event at one of the displayed application icons 200. In some embodiments, the first and second touch events may be discrete touch events. In other embodiments, the first and second touch events may be a swipe event, where the user maintains contact with the display 130 between the fingerprint sensor 140 and one of the application icons 200. FIG. 4 illustrates a swipe interaction beginning at the fingerprint sensor 140 and terminating at the application icon 220. FIG. 5 illustrates one touch event at the fingerprint sensor 140 and another touch event at the application icon 220. In an embodiment using discrete touch events, a time interval limit may be imposed, where the touch events must be received within the allotted time interval (i.e., to avoid false linking between the touches).

In some embodiments, one or more of the application icons 200 may be visible in the low power state prior to any user interactions. In such an embodiment, the AoD interaction may start at one of the application icons 200 and terminate at the fingerprint sensor 140 (i.e., in the opposite direction). The AoD interaction may include discrete touches or a swipe.

Thus, the AoD application 160 may detect an AoD interaction proceeding in either direction between one of the application icons 200 and the fingerprint sensor 140. Even though the AoD application 160 does not unlock the device 100, the identity of the user is still verified during the portion of the interaction occurring at the fingerprint sensor 140. Hence, the user may initiate authenticated interactions with the device 100 locked and in a low power state without unlocking the device or compromising security.

Figure 6:
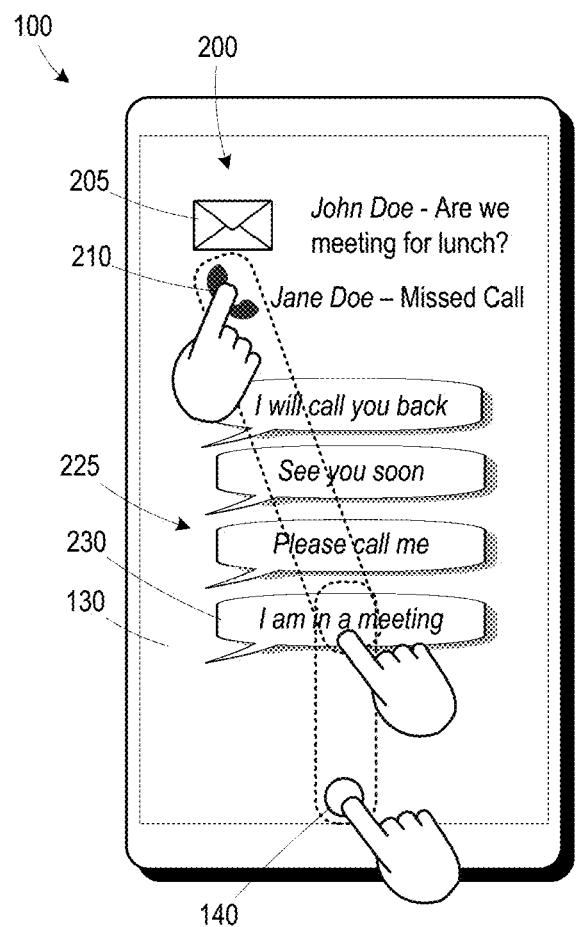

In some embodiments, the user interaction may include an additional interaction other than the fingerprint sensor 140 interaction and the application icon interaction. FIG. 6 illustrates an interaction on the device 100 with an intermediate step. Following an initial touch at the fingerprint sensor 140, the AoD application 160 displays a plurality of predefined response messages 225 and the application icons 200. The user swipes to a selected message 230 and then continues the swipe to the application icon 210. As a result, the AoD application 160 sends the selected message 230 to the individual associated with the application icon 210. The AoD application 160 may indicate the sending of the selected message 230 by changing the application icon, providing an audible notification, a vibration notification, etc. The multiple step interaction may proceed in various directions: from the fingerprint sensor 140 to the message 230, to the application icon 210, from the application icon 210 to the message 230 to the fingerprint sensor 140, from the fingerprint sensor 140 to the application icon 210, to the message 230, etc.

The AoD application 160 activates a function associated with the application icons 200 based on the AoD interaction involving the fingerprint sensor 140. In some embodiments, the AoD application 160 may unlock the device 100 after completing the function associated with the application icon 200. The various functions that may be implemented by the application icons 200 may vary. Various applications may be registered with the AoD application 160 as well as the functions to be performed if the user selects the registered application icon during an AoD interaction involving the fingerprint sensor 140. The registered function may include allowing the user to interact with the application icon 200 (e.g., send a message, snooze notifications from the application, activate alert messages from the application, set dynamic permissions for the application, etc.). The registered function may also involve the application providing information to the user (e.g., show detailed message, show specific information page, show list of alerts, etc.).

In some embodiments, certain aspects of the techniques described above may be implemented by one or more processors of a processing system executing software. The techniques described herein may be implemented by executing software on a computing device, such as the processor 110 of FIG. 1, however, such methods are not abstract in that they improve the operation of the device 100 and the user's experience when operating the device 100. Prior to execution, the software instructions may be transferred from a non-transitory computer readable storage medium to a memory, such as the memory 115 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes detecting an interaction event on a display of a device in a locked mode. The interaction event originates at one of a fingerprint sensor of the device or an application icon and terminates at the other of the fingerprint sensor or the application icon. The interaction event is authenticated using the fingerprint sensor. A function associated with the application icon is activated responsive to authenticating the interaction event without unlocking the device.

A method includes detecting a first touch event at a fingerprint sensor of a device in a locked mode. The first touch event is authenticated using the fingerprint sensor. A second touch event is detected at an application icon displayed on a display of the device within a predetermined time interval before or after the first touch event. A function associated with the application icon is activated without unlocking the device responsive to the first and second touch events.

A device includes a display, a touch sensor for detecting interactions with the display, a fingerprint sensor, and a processor coupled to the touch sensor and the fingerprint sensor. The processor is to detect an interaction event on the display while operating the device in a locked mode. The interaction event originates at one of the fingerprint sensor or an application icon provided on the display and terminates at the other of the fingerprint sensor or the application icon. The processor is to authenticate the interaction event using the fingerprint sensor and activate a function associated with the application icon responsive to authenticating the interaction event without unlocking the device.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
    detecting an interaction event on a display of a device in a locked mode, wherein the interaction event originates at one of a fingerprint sensor of the device or an application icon and terminates at the other of the fingerprint sensor or the application icon;
    authenticating the interaction event using the fingerprint sensor; and
    activating a function associated with the application icon responsive to authenticating the interaction event without unlocking the device.

2. The method of claim 1, further comprising unlocking the device after activating the function associated with the application icon.

3. The method of claim 1, wherein the interaction event originates at the fingerprint sensor, detecting the interaction event comprises detecting a touch event at the fingerprint sensor, and the method further comprises displaying the application icon on the display responsive to detecting the touch event.

4. The method of claim 1, wherein the interaction event originates at the fingerprint sensor, detecting the interaction event comprises detecting a touch event at the fingerprint sensor, and the method further comprises:
    activating the function associated with the application icon without unlocking the device responsive to a time interval associated with the touch event exceeding a predetermined threshold; and
    unlocking the device responsive to the time interval not exceeding the predetermined threshold.

5. The method of claim 1, wherein the interaction event originates at the fingerprint sensor, detecting the interaction event comprises detecting a first touch event at the fingerprint sensor, the method further comprises displaying the application icon on the display responsive to detecting the first touch event, and detecting the interaction event further comprises detecting a second touch event at the application icon.

6. The method of claim 1, wherein detecting the interaction event comprises detecting a continuous touch interaction extending between the fingerprint sensor and the application icon in either direction.

7. The method of claim 1, further comprising receiving a selected parameter during the interaction event, wherein activating the function comprises activating the function using the selected parameter.

8. The method of claim 7, wherein the parameter comprises one of a plurality of messages, and activating the function comprises sending the selected message.

9. A method, comprising:
    detecting a first touch event at a fingerprint sensor of a device in a locked mode;
    authenticating the first touch event using the fingerprint sensor;
    detecting a second touch event at an application icon displayed on a display of the device within a predetermined time interval before or after the first touch event; and
    activating a function associated with the application icon without unlocking the device responsive to the first and second touch events.

10. The method of claim 9, further comprising detecting a continuous touch interaction with the display between the first and second touch events.

11. The method of claim 9, wherein the detecting of the first touch event occurs prior to the detecting of the second touch event, and the method further comprises displaying the application icon responsive to detecting the first touch event.

12. The method of claim 9, wherein the detecting of the first touch event comprises determining that a touch time interval associated with the first touch event exceeds a predetermined threshold, and the method further comprises:
    displaying the application icon responsive to detecting the first touch event; and
    unlocking the device responsive to the time interval not exceeding the predetermined threshold.

13. A device, comprising:
    a display;
    a touch sensor for detecting interactions with the display;
    a fingerprint sensor; and
    a processor coupled to the touch sensor and the fingerprint sensor to detect an interaction event on the display while operating the device in a locked mode, wherein the interaction event originates at one of the fingerprint sensor or an application icon provided on the display and terminates at the other of the fingerprint sensor or the application icon, and the processor is to authenticate the interaction event using the fingerprint sensor and activate a function associated with the application icon responsive to authenticating the interaction event without unlocking the device.

14. The device of claim 13, wherein the processor is to unlock the device after activating the function associated with the application icon.

15. The device of claim 13, wherein the interaction event originates at the fingerprint sensor, and the processor is to detect a touch event at the fingerprint sensor and display the application icon on the display responsive to detecting the touch event.

16. The device of claim 13, wherein the interaction event originates at the fingerprint sensor, and the processor is to detect a touch event at the fingerprint sensor, activate the function associated with the application icon without unlocking the device responsive to a time interval associated with the touch event exceeding a predetermined threshold, and unlock the device responsive to the time interval not exceeding the predetermined threshold.

17. The device of claim 13, wherein the interaction event originates at the fingerprint sensor, and the processor is to detect a first touch event at the fingerprint sensor, display the application icon on the display responsive to detecting the first touch event, and detect a second touch event at the application icon.

18. The device of claim 13, wherein the interaction event comprises a continuous touch interaction extending between the fingerprint sensor and the application icon in either direction.

19. The device of claim 13, wherein the processor is to receive a selected parameter during the interaction event and activate the function using the selected parameter.

20. The device of claim 19, wherein the parameter comprises one of a plurality of messages, and the processor is to activate the function by sending the selected message.

* * * * *